US012620114B2

(12) United States Patent　　(10) Patent No.: US 12,620,114 B2
Kubota　　(45) Date of Patent: May 5, 2026

(54) IMAGE PROCESSING DEVICE AND MACHINE TOOL

(71) Applicant: DMG MORI CO., LTD., Nara (JP)

(72) Inventor: Junichi Kubota, Nara (JP)

(73) Assignee: DMG MORI CO., LTD., Nara (JP)

( * ) Notice: Subject to any disclaimer, the term of this patent is extended or adjusted under 35 U.S.C. 154(b) by 267 days.

(21) Appl. No.: 18/233,380

(22) Filed: Aug. 14, 2023

(65) Prior Publication Data

US 2023/0386066 A1　　Nov. 30, 2023

Related U.S. Application Data

(63) Continuation of application No. PCT/JP2022/000498, filed on Jan. 11, 2022.

(30) Foreign Application Priority Data

Feb. 15, 2021　　(JP) ................................. 2021-021386

(51) Int. Cl.
| | |
|---|---|
| *G06T 7/60* | (2017.01) |
| *B23Q 15/12* | (2006.01) |
| *G06T 7/00* | (2017.01) |
| *G06T 7/70* | (2017.01) |
| *H04N 23/695* | (2023.01) |

(52) U.S. Cl.
CPC ................ *G06T 7/60* (2013.01); *B23Q 15/12* (2013.01); *G06T 7/001* (2013.01); *G06T 7/70* (2017.01); *H04N 23/695* (2023.01); *G06T 2207/30164* (2013.01)

(58) Field of Classification Search
CPC .. G06T 7/60; G06T 7/70; G06T 7/001; G06T 7/62; G06T 2207/30164; H04N 23/695; B23Q 15/12; B23Q 17/22; B23Q 17/24; G05B 19/18
USPC .......................................................... 348/95
See application file for complete search history.

(56) References Cited

U.S. PATENT DOCUMENTS 5,923,560 A　　7/1999　Ozaki et al.
6,915,827 B2 *　7/2005　Haraguchi ........... B23K 20/005
　　　　　　　　　　　　　　　　　　　156/379
(Continued)

FOREIGN PATENT DOCUMENTS

JP　　H09-057579 A　　3/1997
JP　　H10-143216 A　　5/1998
(Continued)

*Primary Examiner* — Thai Q Tran
*Assistant Examiner* — Nienru Yang
(74) *Attorney, Agent, or Firm* — IP Business Solutions, LLC

(57) ABSTRACT

An image processing device includes: a receiving unit that receives an image of a tool from a camera of a machine tool; a measurement unit that measures a first coordinate, which is a position of a first point on a tool or a tool holding unit that holds the tool, in an image captured when the tool and the camera move a first distance relative to each other and measures a second coordinate, which is a position of a second point on the tool or the tool holding unit, in an image captured when the tool and the camera move a second distance relative to each other; and a tool length calculation unit that calculates the length of the tool based on the first coordinate, the second coordinate, the first distance, and the second distance.

4 Claims, 14 Drawing Sheets

(56)            References Cited

U.S. PATENT DOCUMENTS

2003/0133131 A1*  7/2003  Fujishima ............. B23Q 17/22
                                                356/614
2020/0149868 A1*  5/2020  Tezuka ................. G01B 11/026
2020/0180095 A1*  6/2020  Egglestone ........ B23Q 17/2466

FOREIGN PATENT DOCUMENTS

JP        2010-162671  A      7/2010
JP        2012-213840  A      11/2012
JP        2017-021472  A      1/2017

* cited by examiner

110

IMAGE PROCESSING DEVICE AND MACHINE TOOL

CROSS REFERENCE TO RELATED APPLICATIONS

This application is a continuation application of International Application No. PCT/JP2022/000498, filed on Jan. 11, 2022, which claims priority to and the benefit of Japanese Patent Application No. 2021-021386, filed on Feb. 15, 2021. The contents of these applications are incorporated herein by reference in their entirety.

BACKGROUND OF INVENTION

1. Field

This invention relates to tool inspection technology in machine tools.

2. Description of Related Art

Examples of machine tools include devices for cutting a workpiece into a desired shape and devices for depositing metal powder or the like to make a workpiece. Examples of machine tools for cutting include a turning center that machines a workpiece by applying a tool for cutting to the workpiece that is being turned, a machining center that machines a workpiece by applying a turning tool to the workpiece, and a multitasking machine including these functions in combination.

A tools is fixed to a tool holding unit such as a spindle or tool rest. A machine tool machines a workpiece by changing tools and moving the tool holding unit according to a machining program provided in advance. The cutting edges of the tools gradually wear due to friction with the workpiece. The user needs to determine the tool life by checking the tool length as necessary (see Patent Literatures 1 and 2).

RELATED ART LIST

Patent Literature 1: JP H10-143216 A
Patent Literature 2: JP 2017-021472 A

As an example of a method for measuring tool length, e.g., a camera is fixed, and a tool is moved under the camera by moving the tool holding unit a certain distance from the origin position. The tool length is then calculated based on the difference between the center of the image-capturing area and the tool tip. This is because when the tool length is long, the tool tip is detected at a deep position in the image-capturing area, and when the tool length is short, the tool tip is detected at a shallow position in the image-capturing area.

However, the distance from the origin position to the camera increases due to the heat generated by the machine tool during machining. Since the distance from the origin position to the camera is unstable, the tool length measurement results of the above method may be affected by heat.

SUMMARY

An image processing device in an aspect of the present invention includes: a receiving unit that receives an image of a tool from a camera of a machine tool; a measurement unit that measures a first coordinate, which is a position of a first point on a tool or a tool holding unit that holds the tool, in an image captured when the tool and the camera move a first distance relative to each other and measures a second coordinate, which is a position of a second point on the tool or the tool holding unit, in an image captured when the tool and the camera move a second distance relative to each other; and a tool length calculation unit that calculates the length of the tool based on the first coordinate, the second coordinate, the first distance, and the second distance.

The "tool holding unit" may be a spindle, turret, or tool rest. In any case, the tool holding unit can be any member that holds a tool in a machine tool.

An image processing device in another aspect of the invention includes: a receiving unit that receives an image of a tool from a camera of a machine tool; a measurement unit that measures a position coordinate of a predetermined position of a tool or a tool holding unit that holds a tool in an image captured when the tool and the camera move a predetermined distance relative to each other; and a thermal displacement calculation unit that calculates the thermal displacement amount of the machine tool based on the difference between a reference position in an image-capturing area and the measured position coordinate.

An image processing device in another aspect of the invention includes: a receiving unit that receives an image of a tool from a camera of a machine tool; a measurement unit that measures a first coordinate, which is a position of a first point on a reference tool or a tool holding unit, in an image captured when the reference tool and the camera move a first distance relative to each other and calculates a first difference, which is a difference between the reference position and the first coordinate in the image-capturing area, and measures a second coordinate, which is a position of a second point on the tool or the tool holding unit, in an image captured when the reference tool and the camera move a second distance relative to each other and calculates a second difference, which is the difference between the reference position and the second coordinate in the image-capturing area; a holder length calculation unit that calculates the holder length in the tool holding unit based on the first difference and the second difference; and a tool length calculation unit that calculates the length of an inspection target tool, which is the tool to be inspected.

The measurement unit measures a third coordinate, which is a position of a third point on the tool or the tool holding unit that holds the tool, in an image captured when the inspection target tool and the camera move a third distance relative to each other and measures a fourth coordinate, which is a position of a fourth point on the inspection target tool or the tool holding unit, in an image captured when the inspection target tool and the camera move a fourth distance relative to each other, and the tool length calculation unit calculates the length of the inspection target tool based on the third coordinate, the fourth coordinate, the third distance, the fourth distance, and the holder length.

A machine tool in one aspect of the invention includes: a camera that captures an image for measuring a first coordinate and a second coordinate and for calculating a length of a tool based on the first coordinate, the second coordinate, a first distance, and a second distance; a tool holding unit that holds the tool; and a control unit that moves the tool holding unit to move the tool and the camera by the first or second distance relative to each other.

The camera captures a first image when the tool and the camera move a first distance relative to each other and captures a second image when the tool and the camera move a second distance relative to each other.

The first image includes the first coordinate, which is the position of the first point on the tool or the tool holding unit that holds the tool.

The second image includes the second coordinate, which is the position of the second point on the tool or the tool holding unit that holds the tool.

The invention facilitates accurate measurement of tool length.

DETAILED DESCRIPTION

Tools gradually wear out as they machine workpieces. Tools that have become too short, or in other words, tools with a high degree of wear, need to be replaced with another tool. A machine tool 100 in this embodiment inspects the tool length as appropriate after machining workpieces (hereinafter referred to as "tool length inspection").

In the following, the basic configuration of the machine tool 100 is first described, and then an example of tool length inspection (comparative example) is explained with reference to FIGS. 6 and 7. The tool length inspection method shown in the comparative example is called the "one-point measurement method". The problems of the one-point measurement method are also described subsequently. Next, the two types of tool inspection methods in this embodiment are explained as first and second embodiments. Hereafter, the first and second embodiments will be referred to collectively as "this embodiment" when they are referred to together or when they are not specifically distinguished. The tool length inspection method in this embodiment is referred to as the "multi-point measurement method".

Figure 1:
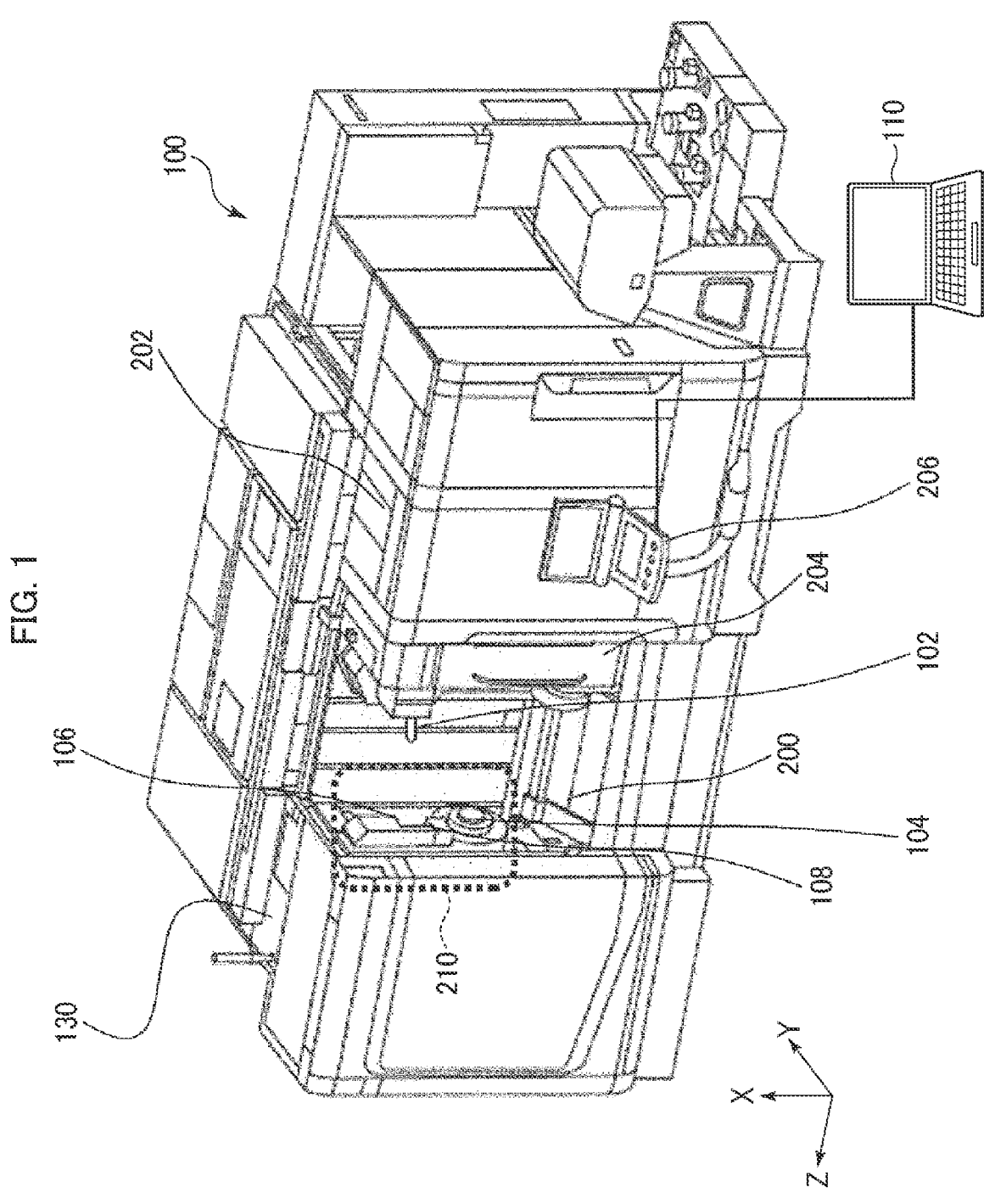
FIG. 1 is an external view of a machine tool.

FIG. 1 is an external view of the machine tool 100.

The machine tool 100 in this embodiment is a multitasking machine for machining a workpiece placed in a machining area 200. The workpiece is fixed to a holding unit 104 and cut by a tool 102 attached to a spindle, which is another holding unit. The holding unit 104 holding the workpiece is rotationally driven by a driving mechanism. The "tool holding unit" in this embodiment is shown as a spindle.

When the tool 102 is inserted into a tool recognition area 210, a lighting device 108 provided at a lower position illuminates the tool 102 and a camera 106 provided at an upper position captures an image of the tool 102. Based on the images captured at this time, tool registration and tool inspection described later are performed. The tool length inspection is performed as part of the tool registration and tool inspection. The configuration of the tool recognition area 210 is described in more detail in connection with FIG. 2 below.

The machine tool 100 is provided with a cover 202 that shuts the machine tool 100 off from the outside. The cover 202 includes a door 204. A user opens the door 204 to install a workpiece in the machining area 200 and to remove the workpiece from the machining area 200. An operation panel 206 accepts various operations on the machine tool 100 from a user.

The operation panel 206 is connected to an image processing device 110. The user can remotely monitor the work status of the machine tool 100 with the image processing device 110. In this embodiment, the machine tool 100 main unit and the image processing device 110 are connected via a wired cable. The image processing device 110 may be formed inside the machine tool 100, e.g., as an internal device of the operation panel 206.

A tool storage unit 130 stores a plurality of tools 102. A tool 102 is selected from the plurality of tools 102 stored in the tool storage unit 130 by a tool changing unit (described later) and attached to the spindle. As shown in FIG. 1, the Y- and Z-axes are defined in the horizontal direction, and the X-axis is defined in the vertical direction. The Z-axis direction corresponds to the axial direction of the spindle and the workpiece.

Figure 2:
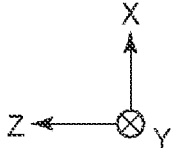
FIG. 2 is a schematic diagram illustrating a positional relation among a tool, a camera, and a lighting device in a tool recognition area.

FIG. 2 is a schematic diagram illustrating a position relation among the tool 102, the camera 106, and the lighting device 108 in the tool recognition area 210.

The tool 102 includes a blade portion 112 used for machining the workpiece and a shank portion 114 to be fixed to a holder 118. A spindle 116 is configured to be rotatable and movable while holding the tool 102. The spindle 116 can also rotate the holding tool.

The camera 106 is equipped with an image sensor (image pickup element) such as a complementary metal oxide semiconductor (CMOS) or charge-coupled device (CCD). The camera 106 captures images of the tool 102 attached to the spindle 116 from above (in the X-axis direction). The camera 106 is connected to the image processing device 110, and the captured images are transmitted to the image processing device 110. The camera 106 is fixed to view the tool recognition area 210. The tool 102 can be imaged from a plurality of directions by rotating the tool 102 about the Z-axis with the spindle 116. In addition, a plurality of locations of the tool 102 can be imaged by moving the tool 102 in the horizontal direction (YZ-direction) with the spindle 116.

The lighting device 108 is fixed at a lower position to face the camera 106. The lighting device 108 illuminates the tool 102 from below. Transmitted illumination provided by the lighting device 108 enables the camera 106 to obtain high contrast captured images that make it easy to grasp the contour position of the tool 102.

When the user newly registers a tool 102, the user sets the tool registration mode in the operation panel 206 and attaches the tool 102 to the spindle 116. Next, the user inputs a desired tool ID. The spindle 116 moves and rotates the tool 102, and the fixed camera 106 automatically images the tool 102 from various positions and directions. From a number of captured images obtained by the camera 106, the tool shape is recognized, and the tool ID and the tool shape are registered in association with each other. With such a control method, the tool shape can be automatically registered for each tool 102 in association with the tool ID. The tool shape is represented by two-dimensional or three-dimensional data. At the time of tool registration, the tool length inspection is also performed, details of which are described later.

When performing an inspection on the tool 102 during or after machining, the spindle 116 also moves the tool 102 into the tool recognition area 210. As with new tool registration, the spindle 116 moves and rotates the tool 102, and the camera 106 automatically captures images of the tool 102 from various positions and directions. The tool shape is recognized from the numerous images captured by the camera 106. This type of inspection, which is performed as needed during machining, is referred to as "tool inspection". The tool length inspection is also performed at the time of tool registration. The user determines the degree of wear and whether or not the tool 102 contains nicks by comparing the tool shape data at the time of tool registration with the tool shape data at the time of tool inspection.

The camera 106 in this embodiment has a resolution of about one million pixels (1224×1024). The imaging range is about 16.8 millimeters×14.0 millimeters. The camera 106 can capture up to 80 images per second.

Figure 3:
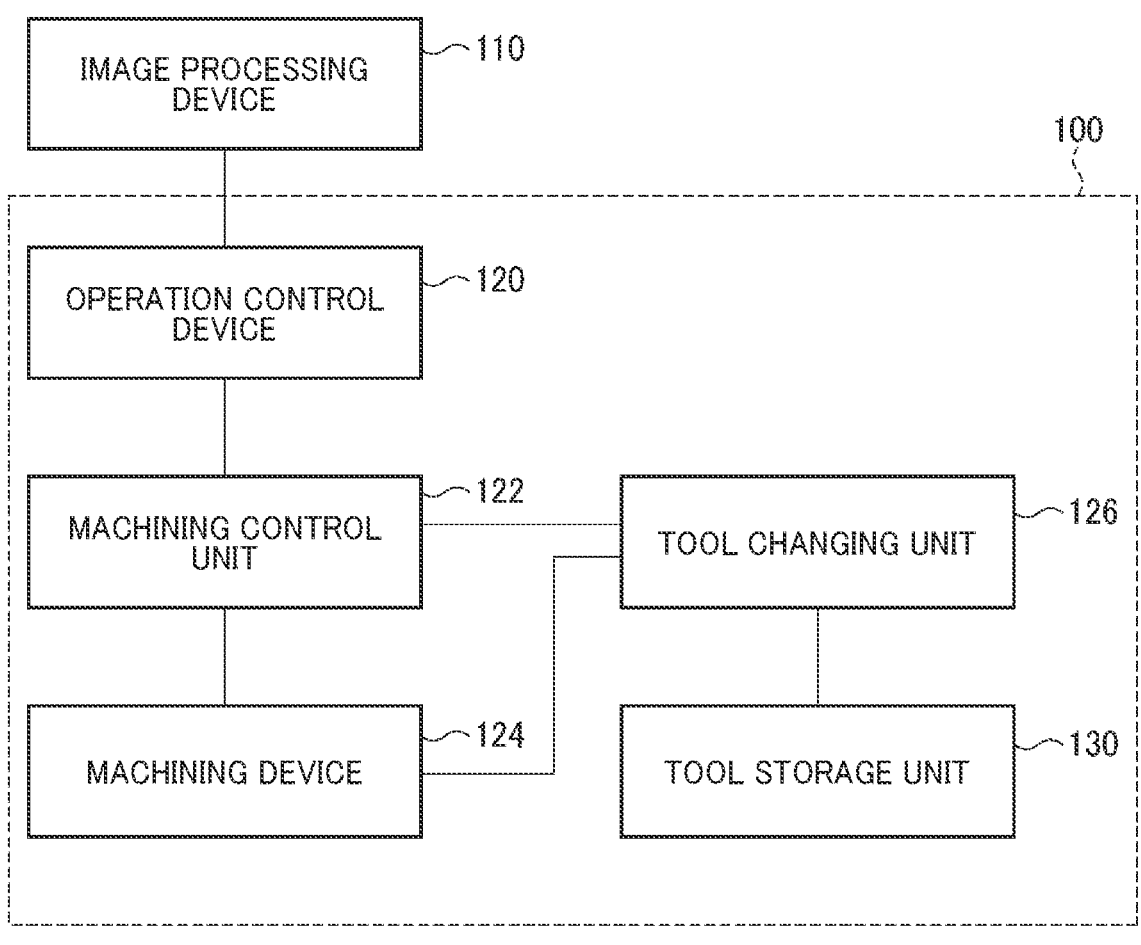
FIG. 3 illustrates a hardware configuration of a machine tool and an image processing device.

FIG. 3 illustrates a hardware configuration of the machine tool 100 and the image processing device 110. The machine tool 100 includes an operation control device 120, a machining control unit 122, a machining device 124, a tool changing unit 126, and the tool storage unit 130. The machining control unit 122, which functions as a numerical controller, transmits a control signal to the machining device 124 according to a machining program. The machining device 124 machines the workpiece by moving the spindle 116 according to instructions from the machining control unit 122.

The operation control device 120 includes the operation panel 206 and controls the machining control unit 122. The tool storage unit 130 stores tools. The tool changing unit 126 corresponds to the so-called automatic tool changer (ATC). The tool changing unit 126 takes out a tool from the tool storage unit 130 according to the change instruction from the machining control unit 122 and exchanges the tool 102 in the spindle 116 with the tool 102 taken out.

The image processing device 110 mainly performs image processing, such as tool shape recognition. As described above, the image processing device 110 may be configured as a part of the operation control device 120. The image processing device 110 may be a typical laptop personal computer (PC) or tablet computer.

Figure 4:
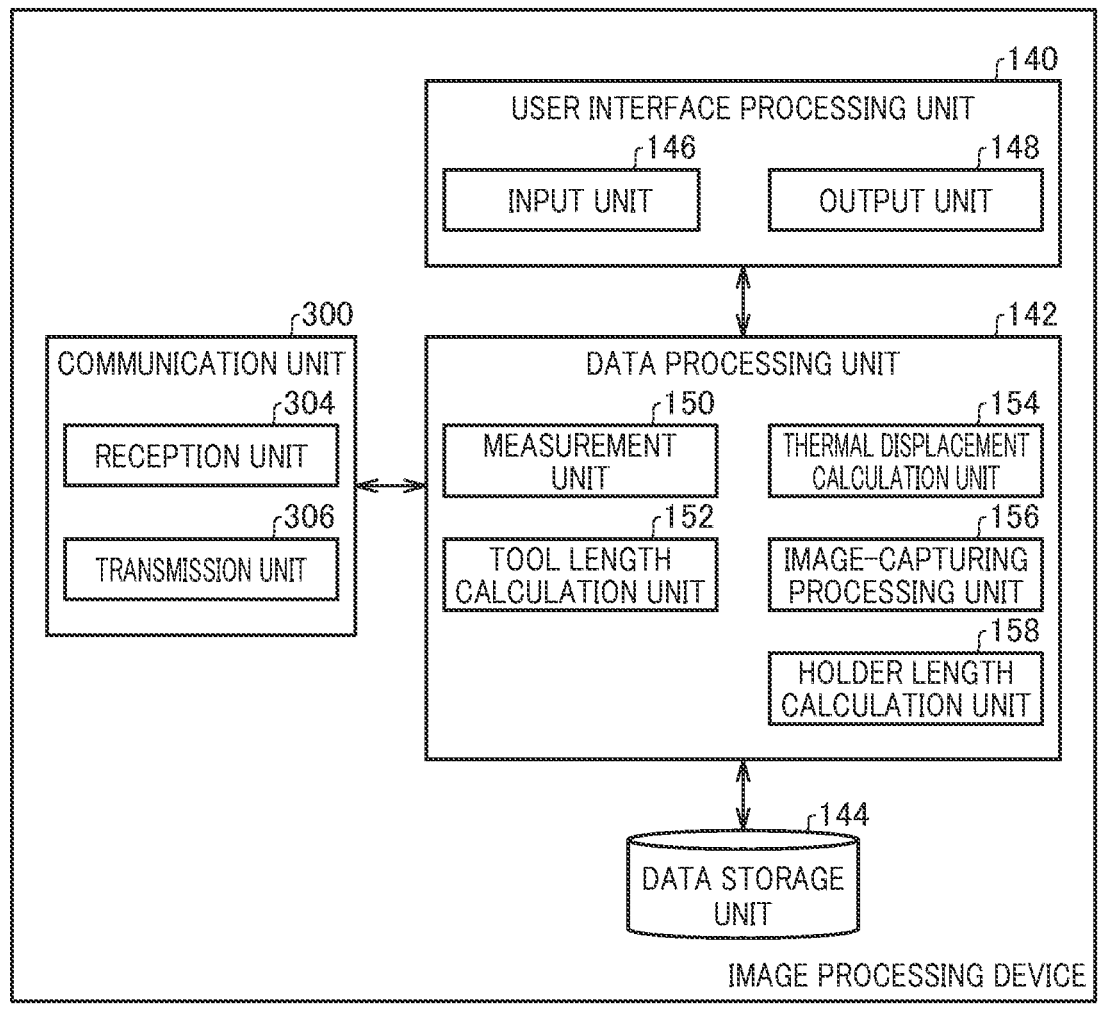
FIG. 4 is a functional block diagram of an image processing device.

FIG. 4 is a functional block diagram of the image processing device 110.

Each component of the image processing device 110 is implemented by hardware including computing units such as central processing units (CPUs) and various computer processors, a storage device such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Each of the blocks described later represents a functional block, not a hardware block.

Note that the operation control device 120 and the machining control unit 122 may also be implemented by hardware, including a computing unit such as processors, storage units such as memory and storage, wired or wireless communication lines connecting them, and software or programs stored in the storage units to supply processing instructions to the computing units on an operating system independent from the image processing device 110.

The image processing device 110 includes a user interface processing unit 140, a data processing unit 142, a communication unit 300, and a data storage unit 144.

The user interface processing unit 140 is responsible for processing related to the user interface, such as image display and audio output, in addition to accepting operations from the user. The communication unit 300 is responsible for communication with the operation control device 120. The data processing unit 142 performs various processes based on the data acquired by the user interface processing unit 140 and the data stored in the data storage unit 144. The data processing unit 142 also functions as an interface for the user interface processing unit 140, the communication unit 300, and the data storage unit 144. The data storage unit 144 stores various programs and setting data.

The user interface processing unit 140 includes an input unit 146 and an output unit 148.

The input unit 146 accepts input from the user via a touch panel, mouse, keyboard, or other hard devices. The output unit 148 provides various kinds of information to the user via image display or audio output.

The communication unit 300 includes a reception unit 304 which receives data from the operation control device 120 and a transmission unit 306 which transmits data and commands to the operation control device 120.

The data processing unit 142 includes a measurement unit 150, a tool length calculation unit 152, a thermal displacement calculation unit 154, an image-capturing processing unit 156, and a holder length calculation unit 158.

The image-capturing processing unit 156 controls the camera 106 to capture images of the tool 102. The machining control unit 122 moves the spindle 116 directly under the camera 106, and the image-capturing processing unit 156 captures an image of the tool 102. The direction and amount of movement of the spindle 116 may also be instructed to the machining control unit 122 from the image-capturing processing unit 156. The measurement unit 150 measures the tip position of the tool 102, the end face position of the holder 118, and the end face position of the spindle 116 in the captured image. The tool length calculation unit 152 calculates the tool length based on the measurement results obtained by the measurement unit 150 by using the method described later. The thermal displacement calculation unit 154 calculates the stretched length of the base of the machine tool 100, which is stretched by heat during machining (described later). The holder length calculation unit 158 calculates the "holder length," which is the length of the holder 118.

Figure 5:
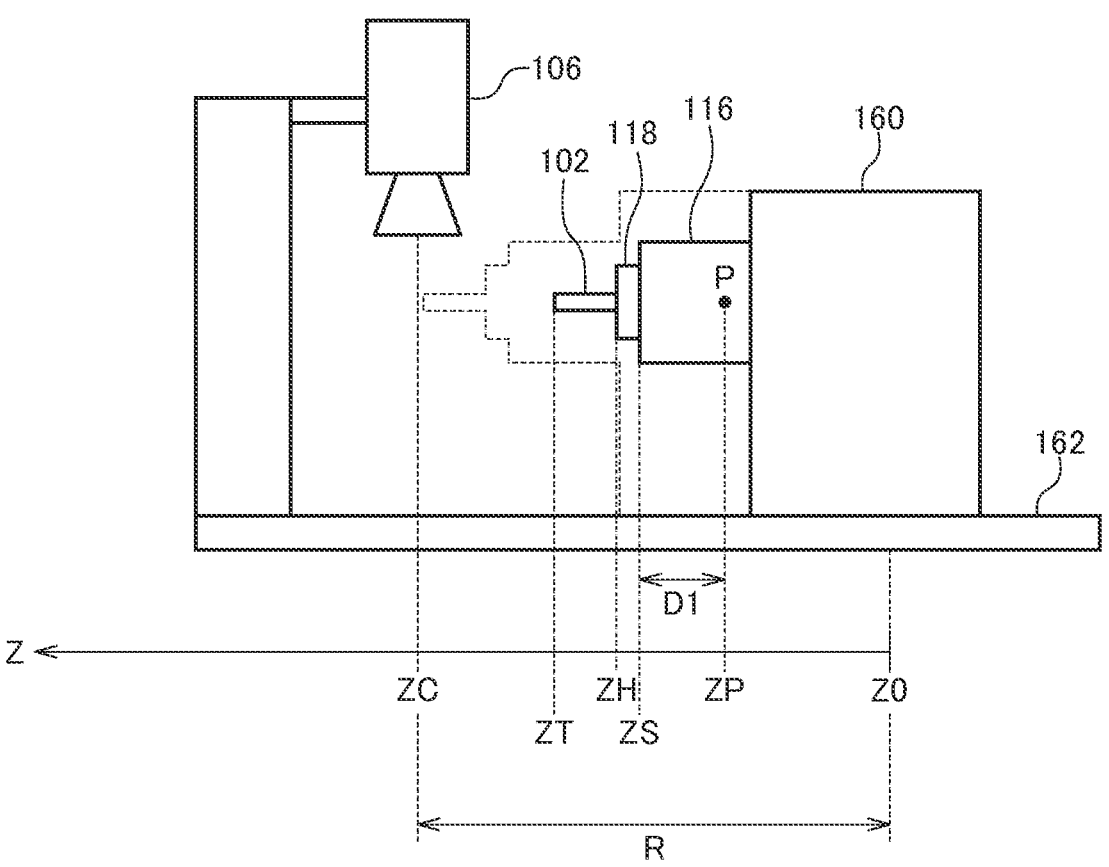
FIG. 5 is a side view schematically illustrating the positional relationship between a camera and a spindle.

FIG. 5 is a side view schematically illustrating the positional relationship between the camera 106 and spindle 116.

The spindle 116 is fixed to a spindle head 160. The spindle head 160 can move in the Z-direction on a base 162 of the machine tool 100. The camera 106 is fixed to the base 162. The machining control unit 122 controls the movement of the spindle head 160.

The amount of movement of the spindle head 160 can be measured by an encoder built into the base 162. A "spindle reference point P" is set in advance at a predetermined position of the spindle 116. The Z coordinate of the initial position of the spindle reference point P is defined as the "origin coordinate Z0". The encoder measures the movement of the spindle reference point P. The Z coordinate corresponding to the center of the image-capturing area of the camera 106 is defined as the "camera coordinate ZC" used as the reference position. Since the camera 106 is fixed to the base 162, the distance R from the origin coordinate Z0 to the camera coordinate ZC is constant. However, the base 162 may be heated during processing, and the base 162 itself may stretch, causing the distance R (=ZC−Z0) to be larger than normal. Such a stretching effect of the base 162 due to heat is hereinafter referred to as "thermal displacement", and the amount of stretching is called the "thermal displacement amount".

The Z coordinate of the end face of the spindle 116 (hereinafter referred to as the "spindle end face") is referred to as the "spindle coordinate ZS", the Z coordinate of the end face of the holder 118 (hereinafter referred to as the "holder end face") is referred to as the "holder coordinate ZH", and the Z coordinate of the tip of the tool 102 (hereinafter referred to as the "tool tip") is referred to as the "tip coordinate ZT. The Z coordinate of the spindle reference point P is referred to as the "spindle reference coordinate ZP. As the spindle head 160 moves, the spindle coordinate ZS, the holder coordinate ZH, and the tip coordinate ZT change. By moving the spindle head 160 (tool tip, holder end face, spindle end face, and spindle reference point P) toward the image-capturing area of the camera 106, the tool length is calculated based on the amount of movement of the spindle head 160 according to the method described later. Tool length means "the length from the tool tip to the spindle end face". That is, the tool length is "ZT−ZS".

The encoder measures the amount of movement of the spindle reference point P. The distance D1 from the spindle coordinate ZS to the spindle reference coordinate ZP is known and constant.

The tool 102 to be inspected for wear and breakage in the tool inspection is hereinafter referred to as the "inspection target tool". The tool 102 that is not worn is referred to as the "reference tool".

All or a portion of the support base that secures the spindle head 160, the base 162, the spindle 116, and the camera 106 corresponds to the "support unit".

Comparative Example

Figure 6:
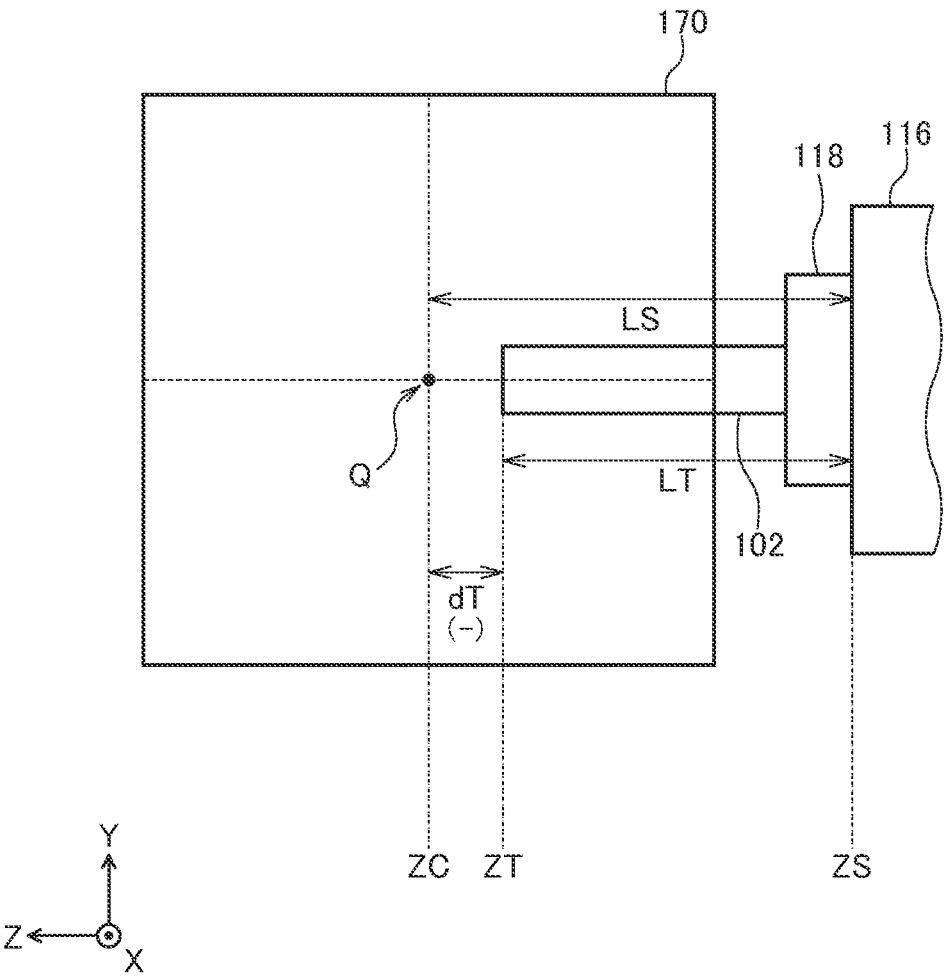
FIG. 6 is a schematic diagram of an image captured when an inspection target tool is short in a comparative example.

FIG. 6 is a schematic diagram of an image captured when an inspection target tool is short in a comparative example.

In the comparative example, the machining control unit 122 moves the spindle head 160 in the Z-direction by a predetermined distance MA from the origin position Z0. In the case of a reference tool (tool length LS), it is known in advance that the tool tip will coincide with the center Q of an image-capturing area 170 (camera coordinate ZC) when the spindle head 160 is moved by the distance MA. When the tool length of the inspection target tool is shorter than the tool length LS, the tool tip appears to the right of the camera center Q (Z-axis negative direction). In this case, the measurement unit 150 calculates the difference "dT (=ZT−ZC)" between the camera coordinate ZC and the tip coordinate ZT. The tool length calculation unit 152 can calculate the tool length LT of the inspection target tool as "LS−dT".

Figure 7:
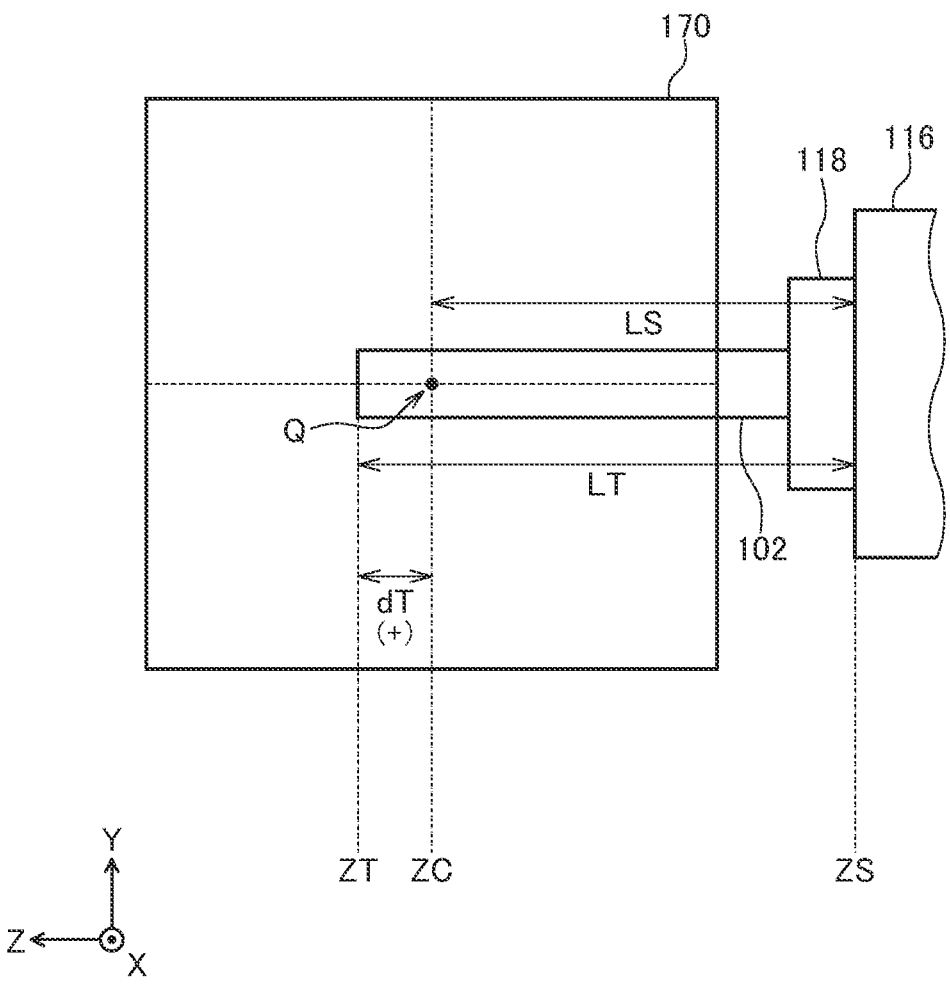
FIG. 7 is a schematic diagram of an image captured when an inspection target tool is long in a comparative example.

FIG. 7 is a schematic diagram of an image captured when an inspection target tool is long in a comparative example.

As with the above, the machining control unit 122 moves the spindle head 160 by the distance MA with the long tool 102 attached. When the tool length is longer than the tool length LS, the tool tip appears to the left of the center Q (Z-axis positive direction). In this case as well, the measurement unit 150 calculates the difference "dT (=ZT−ZC)" between the camera coordinate ZC and the tip coordinate ZT. The tool length calculation unit 152 can calculate the tool length LT of the inspection target tool as "LS+dT".

Thus, the tool length LT of the inspection target tool can be calculated by measuring the tool length LS of the reference tool in advance and measuring the difference dT between the tool tip and the camera center point Q after moving the inspection target tool the predetermined distance MA. However, the method in the comparative example has the problem that measurement errors occur due to thermal displacement.

The one-point measurement method shown in the comparative example assumes that the spindle coordinate ZS is unchanged when the spindle 116 is moved by the distance MA. However, if the base 162 is stretched due to thermal displacement, the tool tip will appear to the right of the assumed position when the spindle 116 is moved by the distance MA. In other words, the difference dT is likely to be estimated to be less than the actual value.

The inventor has experimented and found that when the temperature of the base 162 changes from 23.0° C. to 25.5° C., the tool length is measured as 170.08 mm for a tool 102 having an actual tool length of 170 mm. The 0.08-millimeter measurement error is due to the thermal displacement of the base 162. Although the encoder is able to accurately measure the movement of the spindle head 160, the length of the base 162 itself (the coordinate system itself) changes, making it impossible to calculate the tool length correctly.

First Embodiment

In the first embodiment (multi-point measurement method), the machine tool 100 measures two points, the spindle end face and the tool tip, and measures the tool length based on the distance between the two points. The thermal expansion of the tool 102 or spindle 116 itself is negligible compared to the thermal expansion of the base 162.

Figure 8:
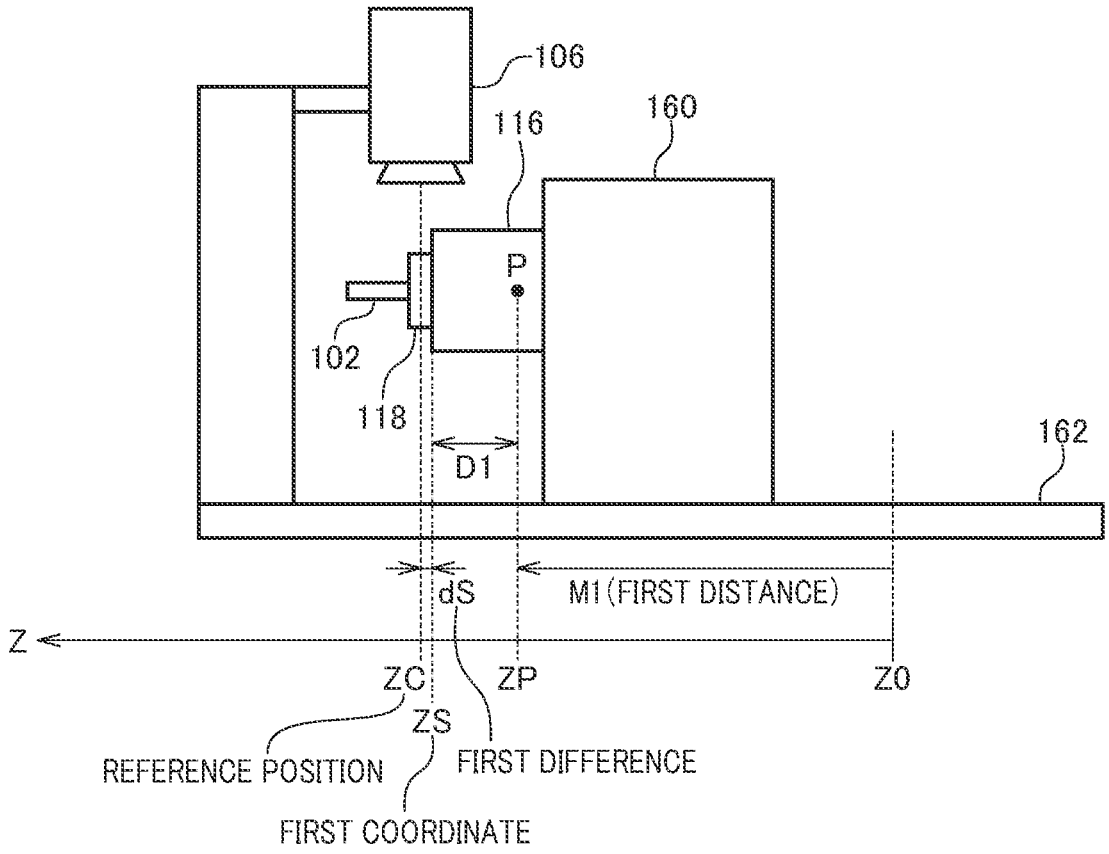
FIG. 8 is a side view schematically illustrating the positional relationship between a camera and a spindle at the time of the spindle end face measurement in the first embodiment.

FIG. 8 is a side view schematically illustrating the positional relationship between the camera 106 and the spindle 116 at the time of the spindle end face measurement in the first embodiment.

First, in the tool length inspection, the image-capturing processing unit 156 instructs the machining control unit 122 to move the spindle head 160 by a first distance M1 (hereinafter simply referred to as the "distance M1") in the Z-axis positive direction with respect to the origin position Z0. In other words, the distance M1 here is the distance from the origin position Z0 to the spindle reference point P of the spindle head 160. The moving distance M1 is a predetermined distance. The camera 106 captures an image of the spindle end face as the "first point". The Z coordinate of the first point (spindle end face) is the "first coordinate". The measurement unit 150 calculates the first difference dS by calculating $dS=ZS-ZC$ with the camera coordinate ZC as the reference position (hereinafter simply referred to as the "difference dS").

Figure 9:
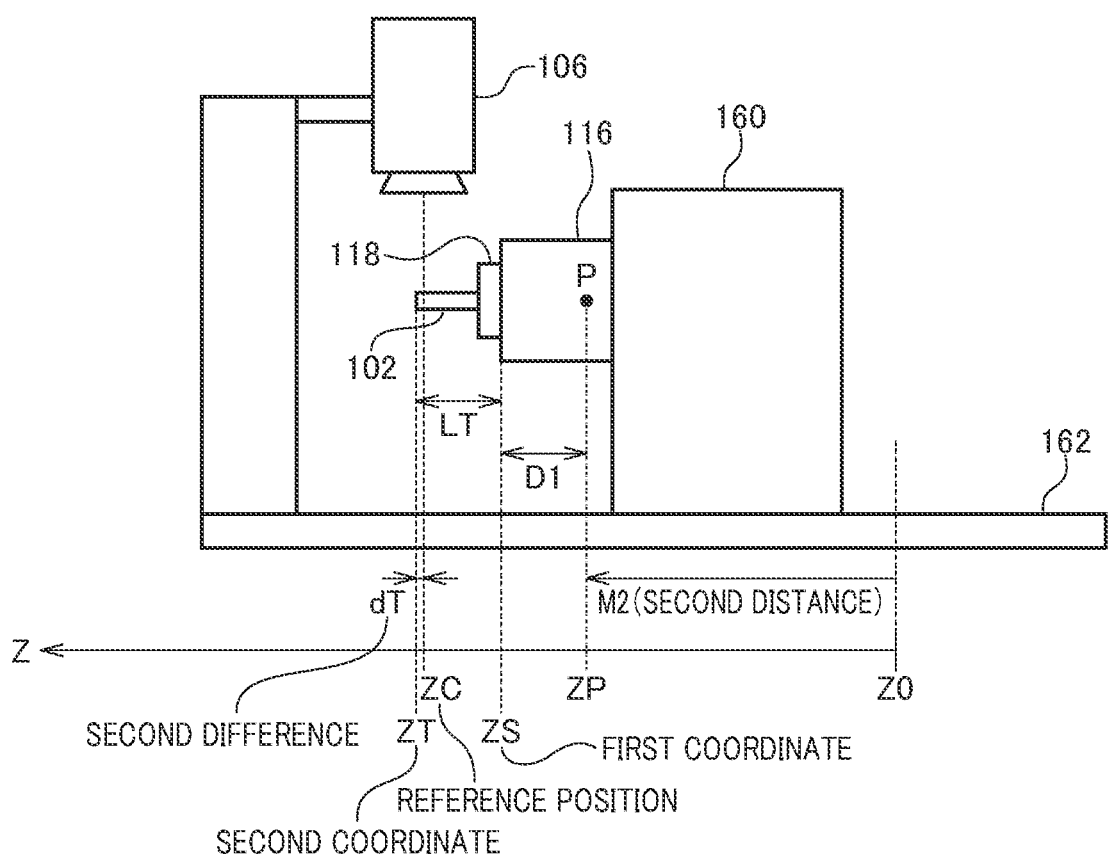
FIG. 9 is a side view schematically illustrating the positional relationship between the camera and the spindle at the time of the tool tip measurement in the first embodiment.

FIG. 9 is a side view schematically illustrating the positional relationship between the camera 106 and the spindle 116 at the time of the tool tip measurement in the first embodiment.

After measuring the spindle end face, the machining control unit 122 moves the spindle head 160 by a second distance M2 in the Z-axis positive direction with respect to the origin position Z0 (hereinafter referred to simply as the "distance M2"). In other words, the distance M2 here is the distance from the origin position Z0 to the spindle reference point P of the spindle head 160. The moving distance M2 is also a predetermined distance. The camera 106 captures an image of the tool tip as the "second point". The Z coordinate of the second point (tool tip) is the "second coordinate". The measurement unit 150 calculates the second difference dT by $dT=ZT-ZC$ (hereinafter simply referred to as the "difference dT").

The difference in the amount of movement in the spindle end face measurement (FIG. 8) and in the tool end face measurement (FIG. 9) is M1−M2. M1−M2 is corrected by the difference dS and the difference dT. Specifically, the tool length calculation unit 152 calculates the tool length of the inspection target tool as $LT=(M1-M2)+dT+dS$. In other words, the tool length of the inspection target tool $LT=(\text{first distance}-\text{second distance})+(\text{second coordinate}-\text{reference position})+(\text{first coordinate}-\text{reference position})$. The "first distance−second distance" corresponds to the "basic difference".

Figure 10:
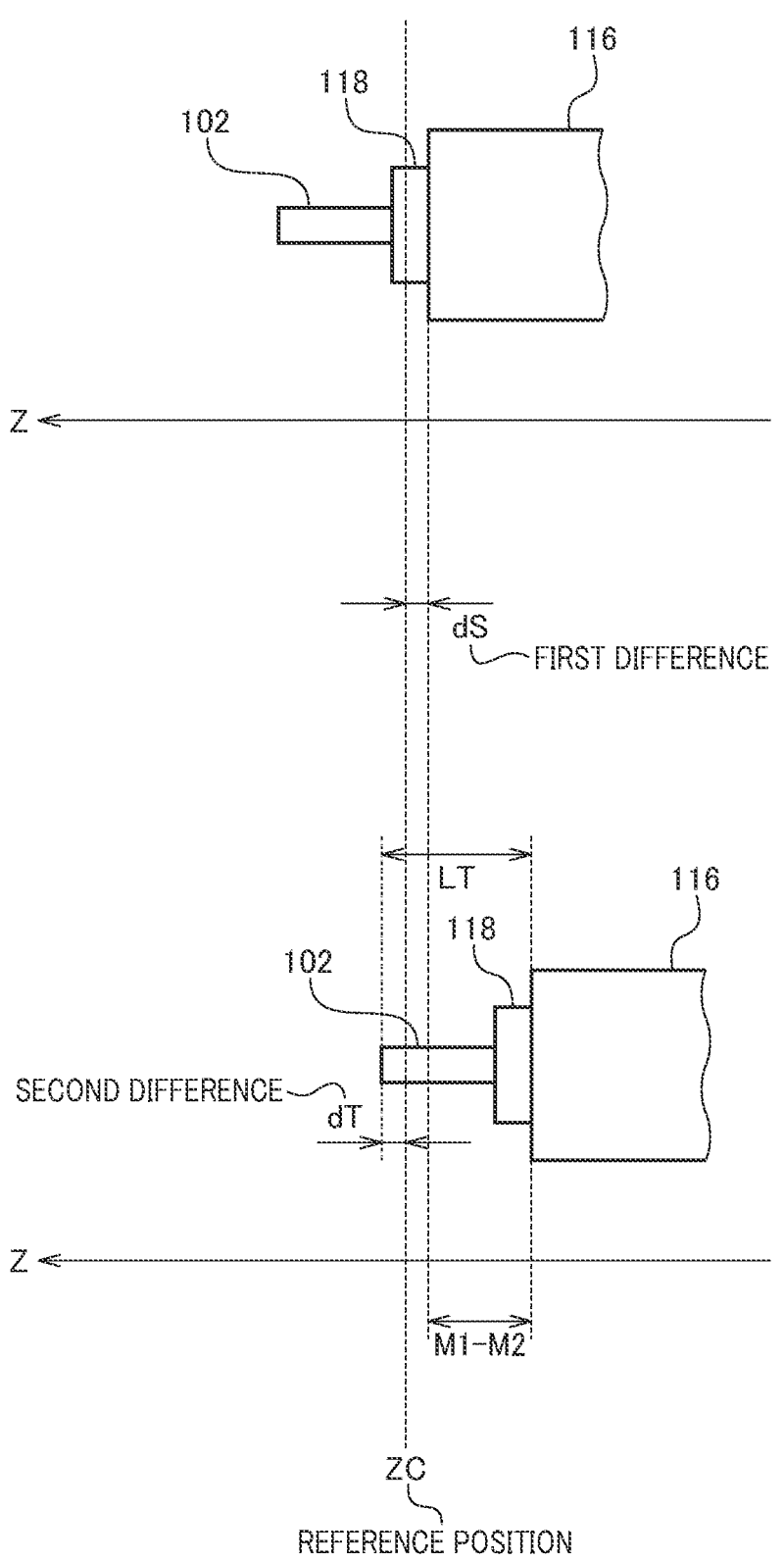
FIG. 10 is a schematic diagram for explaining a tool length calculation method in the first embodiment.

FIG. 10 is a schematic diagram for explaining a tool length calculation method in the first embodiment.

When both the difference dS and the difference dT are zero, the tool length $LT=M1-M2$. In FIG. 10, the difference dT (in the positive direction) is detected. Therefore, the tool length needs to be corrected to $LT=M1-M2+dT$. In FIG. 10, the difference dS (negative direction) is detected. The difference dS is due to the thermal displacement of the base 162. The tool length calculation unit 152 further corrects the tool length to $LT=M1-M2+dT+dS$. According to this control method, the tool length LT can be calculated more accurately by taking into account the thermal displacement of the spindle 116.

The inventors had experimented and found no significant measurement error for a tool 102 with an actual tool length of 170 mm when the temperature of the base 162 changed from 23.0° C. to 25.5° C. Since the multi-point measurement method calculates the tool length LT from the differences for the spindle end face and tool tip, it is not affected by thermal displacement of the base 162, allowing more accurate tool length inspection.

Second Embodiment

In the second embodiment (multi-point measurement method), a situation is assumed where the spindle 116 cannot enter the tool recognition area 210 because the tool recognition area 210 is small. In the second embodiment, the holder end face is measured instead of the spindle end face. First, the holder length LH, which is the length of the holder 118, is measured based on the reference tool. After the measurement of the holder length LH, the tool length LT of the inspection target tool is measured. It is assumed that the tool length LS of the reference tool is known.

Figure 11:
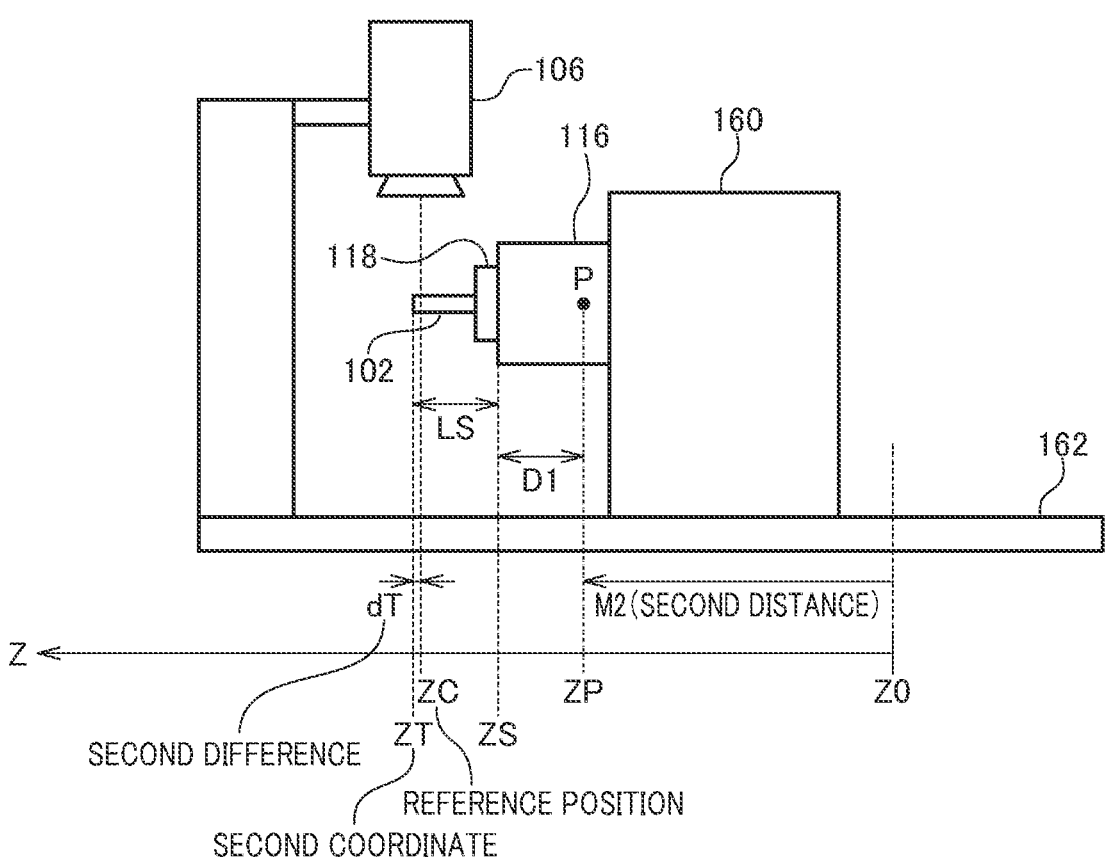
FIG. 11 is a side view schematically illustrating the positional relationship between the camera and the spindle at the time of the tool tip measurement of a reference tool in the second embodiment.

FIG. 11 is a side view schematically illustrating the positional relationship between the camera 106 and the spindle 116 at the time of the tool tip measurement of a reference tool in the second embodiment.

First, the image-capturing processing unit 156 instructs the machining control unit 122 to move the spindle head 160 by a second distance M2 in the Z-axis positive direction with respect to the origin position Z0. The camera 106 captures an image of the tool tip as the "second point". In the second embodiment as well, the Z coordinate of the second point (tool tip) is the "second coordinate". The measurement unit 150 detects the tip coordinate ZT as the second coordinate. The measurement unit 150 calculates the second difference dT by $dT=ZT-ZC$ (hereinafter simply referred to as the "difference dT"). In FIG. 11, the difference $dT>0$ (difference in the positive direction).

The measurement unit 150 calculates the distance R from the origin coordinate Z0 to the camera coordinate ZC. The distance R can be calculated by $R=M2+D1+LS-dT$. The distance D1 is the length from the spindle end face to the spindle reference point P. Both the distance D1 and the tool length LS of the reference tool are constant and known. The distance M2 can be accurately measured by the encoder. The difference dT can also be measured by the measurement unit 150. Therefore, the measurement unit 150 can calculate the distance R. The distance R is desirably a constant value but may vary due to the thermal displacement of the base 162. The thermal displacement is included in the difference dT.

Figure 12:
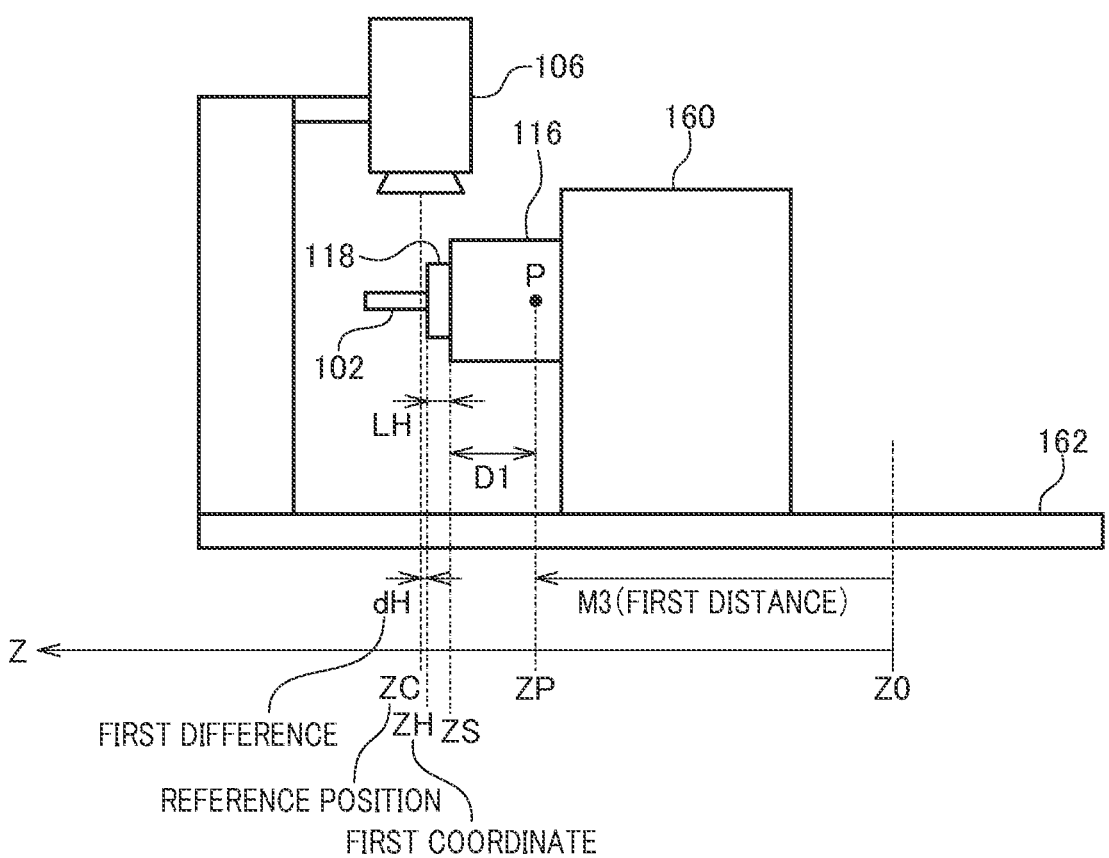
FIG. 12 is a side view schematically illustrating the positional relationship between the camera and the spindle at the time of the holder end face measurement of the reference tool in the second embodiment.

FIG. 12 is a side view schematically illustrating positional relationship between the camera 106 and the spindle 116 at the time of the holder end face measurement of the reference tool in the second embodiment.

After measuring the tool tip of the reference tool, the machining control unit 122 moves the spindle head 160 by a first distance M3 in the Z-axis positive direction with respect to the origin position Z0 (hereinafter referred to simply as the "distance M3"). The moving distance M3 is also a predetermined distance. The distance M1 in the first embodiment and the distance M3 in the second embodiment need not be the same. The camera 106 captures an image of the holder end face as the "first point". In the second embodiment, the Z coordinate of the first point (holder end face) at the time of reference tool measurement is the "first coordinate". The holder length calculation unit 158 calculates the first difference dH by $dH=ZH-ZC$ (hereinafter referred to simply as the "difference dH"). In FIG. 12, the difference $dH<0$ (difference in the negative direction).

The distance R from the origin position Z0, which is the initial position of the spindle reference point P, to the camera coordinate ZC is calculated as $R=M3+D1+LH+dH$. The distance D1 is constant and known. The distance R has already been calculated at the time of the tool tip measurement as described above. The distance M3 can be accurately measured by the encoder. The difference dH can be measured by the measurement unit 150. Only the holder length LH of the reference tool is unknown. Therefore, the holder length LH can be calculated by $LH=R-M3-D1-dH$. By using this calculation method, the measurement unit 150 calculates the holder length LH of the reference tool.

Figure 13:
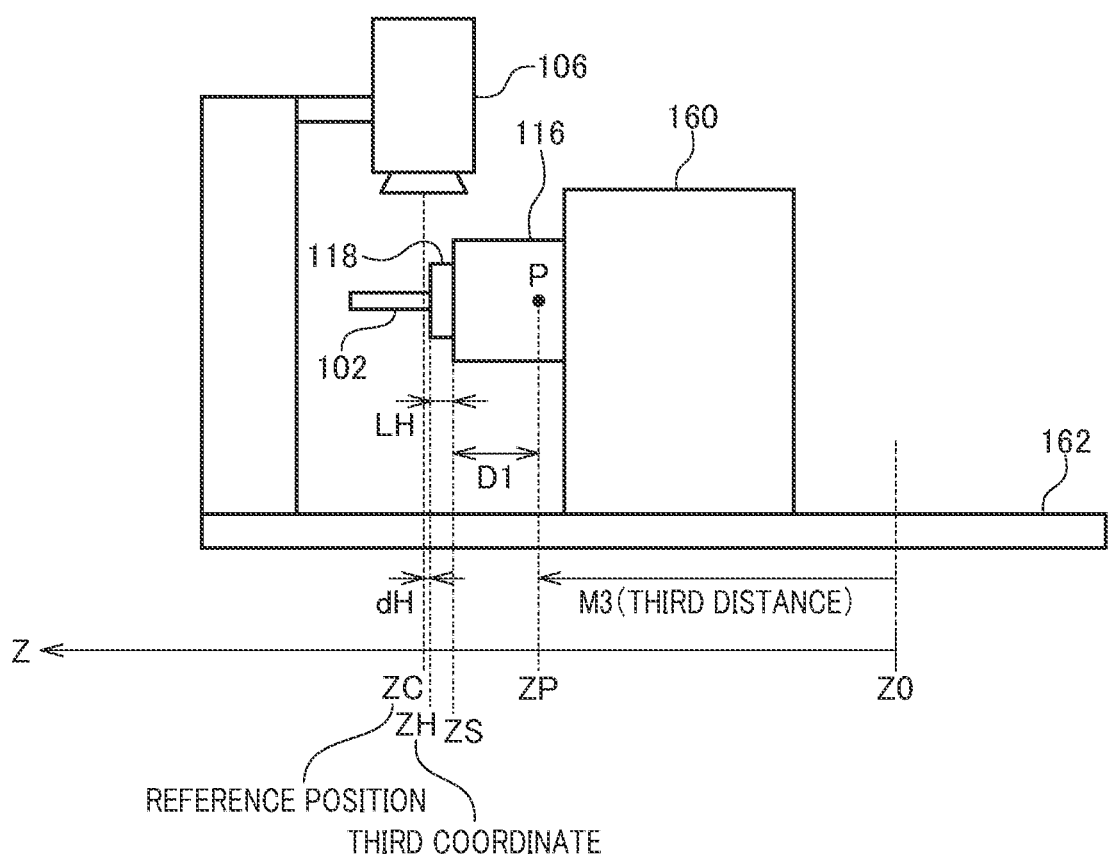
FIG. 13 is a side view schematically illustrating the positional relationship between the camera and the spindle at the time of the holder end face measurement of the inspection target tool in the second embodiment.

FIG. 13 is a side view schematically illustrating the positional relationship between the camera 106 and the spindle 116 at the time of the holder end face measurement of the inspection target tool in the second embodiment.

After the holder length LH is measured based on the reference tool, the tool is replaced with the inspection target tool. First, with respect to the origin position Z0, the machining control unit 122 moves the spindle head 160 in the Z-axis forward direction by a third distance M3 (hereinafter referred to simply as the "distance M3"). In the second embodiment, it is assumed that the distance M3 at the time of the reference tool measurement and the distance M3 at the time of the inspection target tool measurement are the same. The camera 106 captures an image of the holder end face as the "third point". In the second embodiment, the Z coordinate of the third point (holder end face) at the time of the inspection target tool measurement is the "third coordinate". The measurement unit 150 detects the holder coordinate ZH. The measurement unit 150 calculates the difference dH by dH=ZH−ZC. In FIG. 13, the difference dH<0 (difference in the negative direction).

Figure 14:
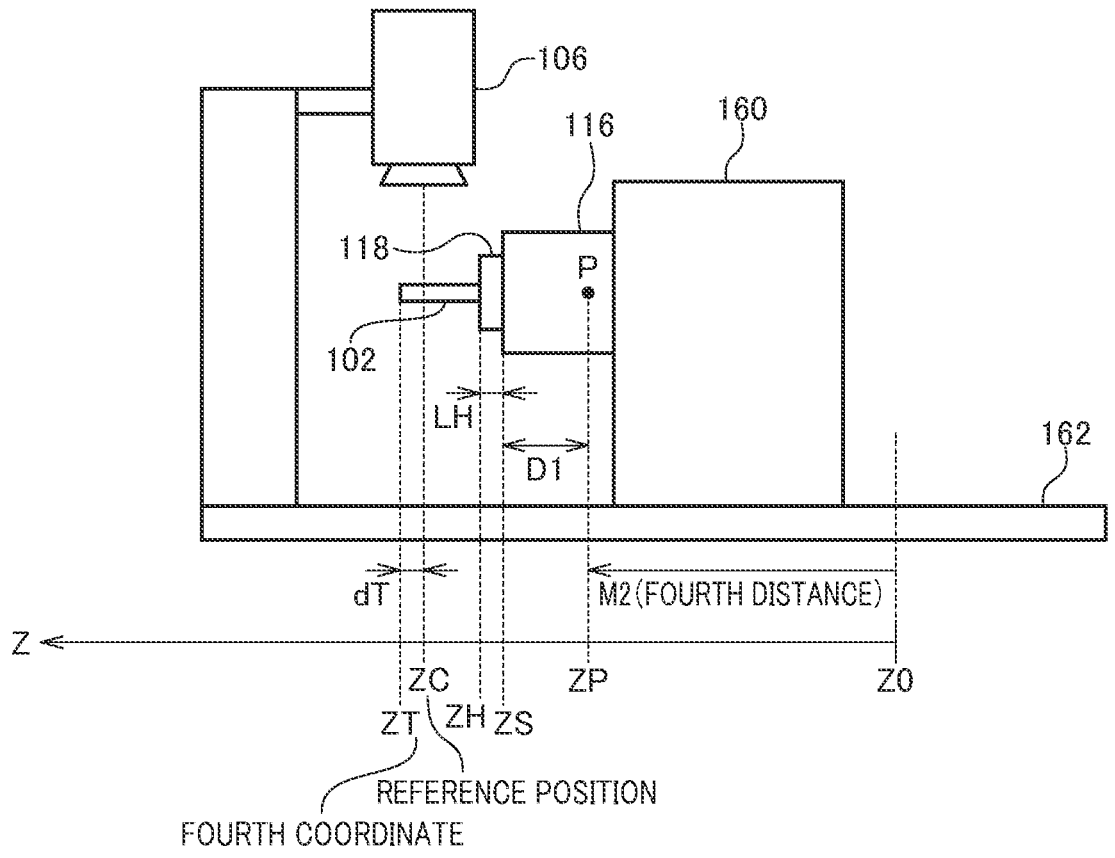
FIG. 14 is a side view schematically illustrating the positional relationship between the camera and the spindle at the time of the tool tip measurement of the inspection target tool in the second embodiment.

FIG. 14 is a side view schematically illustrating the positional relationship between the camera 106 and the spindle 116 at the time of the tool tip measurement of the inspection target tool in the second embodiment.

After measuring the holder end face of the inspection target tool, the machining control unit 122 moves the spindle head 160 by a fourth distance M2 in the Z-axis positive direction with respect to the origin position Z0 (hereinafter referred to simply as the "distance M2"). In the second embodiment, it is assumed that the distance M2 at the time of the reference tool measurement and the distance M2 at the time of the inspection target tool measurement are the same. The camera 106 captures an image of the tool tip as the "fourth point". In the second embodiment, the Z coordinate of the fourth point (tool tip) at the time of the inspection target tool measurement is the "fourth coordinate". The measurement unit 150 calculates the difference dT by dT=ZT−ZC. In FIG. 14, the second difference dT>0 (difference in the positive direction).

The difference in the amount of movement between the holder end face measurement (FIG. 13) and the tool tip measurement (FIG. 14) is M3−M2. By the correction with the difference dH and the difference dT, the tool length calculation unit 152 calculates the tool length LT=(M3−M2)+dT+dH+LH for the inspection target tool. In other words, the tool length LT of the inspection target tool is calculated by LT=(third distance−fourth distance)+(fourth coordinate−reference position)+(third coordinate−reference position)+holder length.

According to the above measurement method, it is possible to calculate not only the tool length but also the thermal displacement amount of the base 162. For example, the second distance M3 is set in advance so that the tool tip of the reference tool and the camera center coincide when the spindle head 160 is moved by the second distance M3 with the reference tool attached (see FIG. 11). In this case, the thermal displacement calculation unit 154 can calculate the difference dT when the spindle head 160 is moved by the second distance M3 as the thermal displacement amount.

SUMMARY OF EMBODIMENT

The machine tool 100 and image processing device 110 have been described based on the embodiments described above.

According to the multi-point measurement method shown in this embodiment, the tool length of the inspection target tool can be calculated more accurately by considering the effect of thermal displacement due to the heating of the base 162. It is also possible to calculate the thermal displacement amount of the base 162 by using a reference tool for which the tool length is known. As shown in the second embodiment, if the spindle end face cannot be measured because the tool recognition area 210 is narrower than the spindle 116, the tool length of the inspection target tool can be measured with the same accuracy by measuring the holder end face.

The present invention is not limited to the embodiments described above and modifications thereof, and any component thereof can be modified and embodied without departing from the scope of the invention. Components described in the embodiments and modifications can be combined as appropriate to form various embodiments. Some components may be omitted from the components presented in the embodiments and modifications.

Modifications

In this embodiment, the tool length is measured by measuring the position coordinates of two points: the tool tip and the spindle end face or the tool tip and the holder end face. The measurement points are not limited to these two points. For example, a marker may be provided on the spindle 116 and the tool length may be measured in the same way by measuring the two positions of the tool tip and the marker position.

In this embodiment, the camera 106 is fixed, and the machining control unit 122 moves the spindle head 160 in the Z-axis direction to change the relative position of the camera 106 and the spindle 116. As a modification, the spindle head 160 may be fixed and the machining control unit 122 may change the relative position of the camera 106 and the spindle 116 by moving the camera 106 in the Z-axis direction. The machining control unit 122 may also change the relative position of the camera 106 and the spindle 116 by moving both the camera 106 and the spindle 116.

The first coordinate as the "first point" described above is not limited to the coordinate of the spindle end face but may be set freely as a predetermined position in the spindle. Although the distance from the origin position Z0 to the spindle reference point P is shown as the first distance M1, the reference point is not limited to the origin position Z0 but may be set as any point in the base 162. The camera coordinate ZC is not limited to the center of the image-capturing area 170 but may be set as any point in the image-capturing area 170.

What is claimed is:

1. An image processing device, comprising:
   a processor including a receiving unit, a measurement unit, and a tool length calculation unit;
   a memory storing various programs and supplying processing instructions,
   wherein the receiving unit receives an image of a tool from a camera of a machine tool;
   the measurement unit measures a first coordinate, which is a position of a first point on a tool or a tool holding unit that holds the tool, in an image captured when the tool and the camera are relatively moved by a first distance from a reference point at which the tool and the camera are separated by a predetermined distance from each other and measures a second coordinate, which is a position of a second point on the tool or the tool holding unit, in an image captured when the tool and the camera are relatively moved by a second distance from the reference point; and
   the tool length calculation unit calculates a length of the tool based on the first coordinate, the second coordinate, and a basic difference which is a difference between the first distance and the second distance, thereby taking into account a stretching effect of a base of the machine tool caused by heat during processing, wherein the first point is an end face position of the tool holding unit, and the second point is a tip position of the tool.

2. The image processing device according to claim 1, wherein the tool length calculation unit calculates the length of the tool by adding a first difference, which is a difference between a reference position in an image-capturing area and the first coordinate, to the basic difference.

3. The image processing device as claimed in claim 2, wherein the tool length calculation unit further calculates the length of the tool by adding the first difference to the basic difference and further adding a second difference, which is the difference between the reference position in the image-capturing area and the second coordinate.

4. A machine tool, comprising:

a camera that captures an image for measuring a first coordinate and a second coordinate and for calculating a length of a tool based on the first coordinate, the second coordinate, and a basic difference which is a difference between a first distance and a second distance, thereby taking into account a stretching effect of a base of the machine tool caused by heat during processing;

a tool holding unit that holds the tool;

a memory that stores various programs and supplying processing instructions; and a processor that moves the tool holding unit to move the tool and the camera by the first or second distance relative to each other, wherein the camera captures a first image when the tool and the camera are relatively moved by the first distance from a reference point at which the tool and the camera are separated by a predetermined distance from each other and captures a second image when the tool and the camera are relatively moved by the second distance from the reference point, the first image includes the first coordinate, which is the position of the first point on the tool or the tool holding unit that holds the tool, the second image includes the second coordinate, which is the position of the second point on the tool or the tool holding unit that holds the tool, and wherein the first point is an end face position of the tool holding unit, and the second point is a tip position of the tool.

* * * * *